July 15, 1924.  
W. CHILDS  
SPRING WHEEL  
Filed May 28 1923  
1,501,583

Witnesses:  
R. E. Hamilton  
R. M. Oakes

Inventor,  
Wallace Childs

Patented July 15, 1924.

1,501,583

UNITED STATES PATENT OFFICE.

WALLACE CHILDS, OF KANSAS CITY, MISSOURI.

SPRING WHEEL.

Application filed May 28, 1923. Serial No. 642,034.

*To all whom it may concern:*

Be it known that I, WALLACE CHILDS, a citizen of the United States, residing at Kansas City, county of Jackson, and State of Missouri, have invented certain new and useful Improvements in Spring Wheels; and I do hereby declare the following to be a full, clear, and exact description of the invention, such as will enable others skilled in the art to which it appertains to make and use the same.

The object of my invention is to provide a spring wheel for a buggy, wagon, truck, automobile or similar vehicle, which will be strong, durable and practical; free from the objections to other similar resilient wheels and especially pneumatic tire wheels.

One object is to provide means to prevent lateral straining of the peripheral tread rim when the wheel is subjected to great straining when turning corners quickly.

Another object is to construct a resilient spoke of two springs in combination and one of said springs a corrugated spring. This corrugated spring may also be used singly as an auxiliary when deemed necessary for greater efficiency in lateral bracing.

These and other objects of advantage will be shown in detail by referring to the specifications and drawing as follows.

Figure 1:
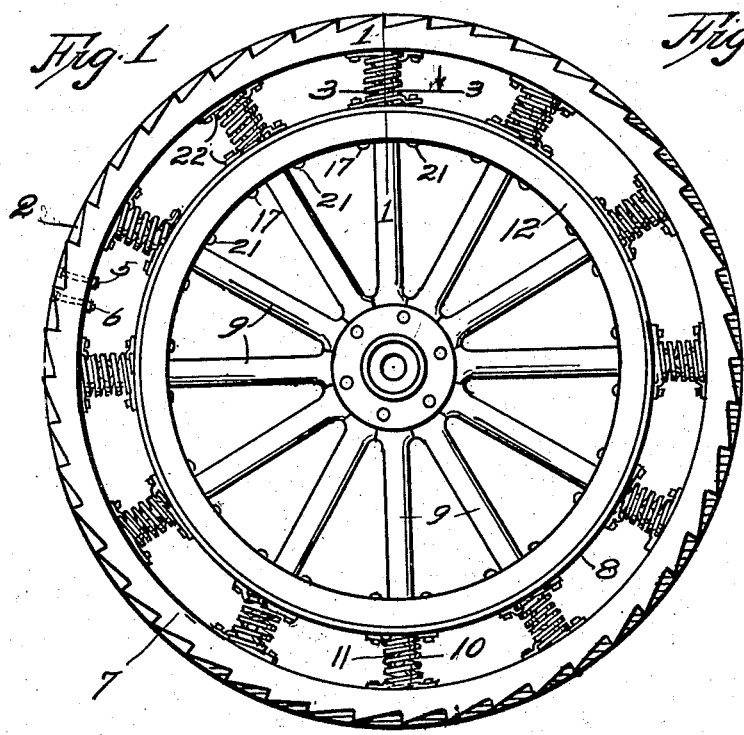
Fig. 1, is a view in elevation of my improved wheel.
Figure 2:
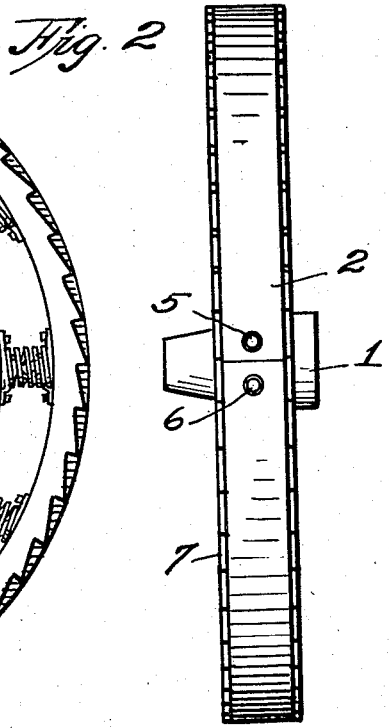
Fig. 2, is an edge view of the wheel shown in Fig. 1.

Fig. 1, shows an automobile or similar vehicle wheel embracing my invention in which 1, represents the hub; 9, the ordinary rigid spokes; 12, the felly; 8, the felly's rigid inner rim; 7, the movable rim, with its cushioned tread 2, 2; 22, shows the plate coupler fastening for the coil wire spring 10, and the metallic corrugated spring 11, with the rubber buffer ball preferable, A, held therein, but the form of said buffer it is apparent may be made cylindrical if preferred, and the buffer of any suitable material. I do not wish to be confined to a "rubber ball," and a buffer may be dispensed with entirely when thought best. 5, and 6, are the bolts and nuts holding the tread 2, 2, in a channeled rim 7, preferably. 13, 14, are the flanges of plate 22, for clasping the corrugated spring 11, at each end; and 15, the clutch for holding at each end the coil wire spring 10, which in combination compose the resilient spoke.

Figures 3, 4, 5:
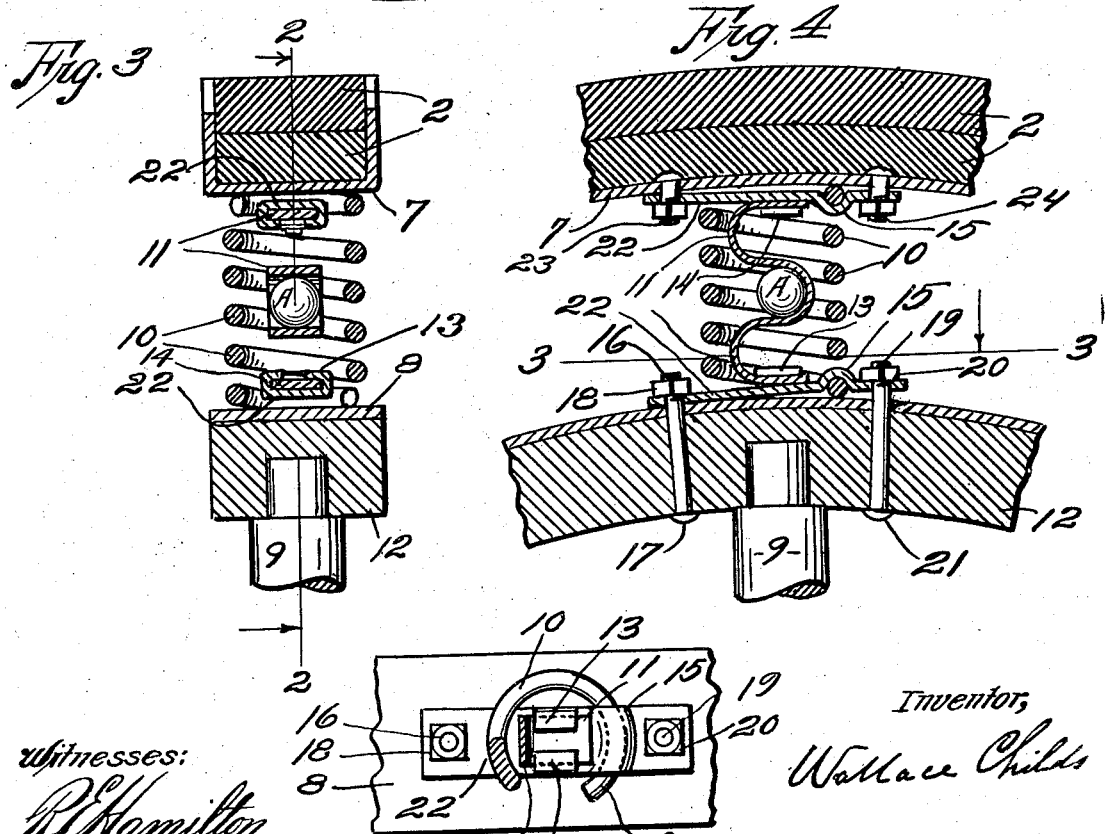
Fig. 3, is an enlarged cross-section of Fig. 1, on line 1—1, but showing the ball A, and the spoke 9, in elevation.
Fig. 4, is a cross-section of Fig. 3, on line 2—2 of Fig. 3.
Fig. 5, is a plan view showing part of Fig. 1, on line 3—3 of Fig. 4, and the plate coupler or fastener for the metal springs.

All parts of the wheel are made in the ordinary way known to mechanical experts and a detail description is not deemed required. Now, to put the parts of the wheel together, place between the outer and movable rim 7, and the inner rim 8, the coupler plate 22, then insert the corrugated spring end 11, under the coupler plate flanges 13 and 14,—see Fig. 5, then place the ball A, in the middle of the corrugated metal ribbon spring 11, and hold it there and bring the coil spring 10, down over both; then bolt the coupler plate 22, at 16, and 18, to the rigid inner rim 8, then pass the coil spring 10, near its end under the clutch 15, of the plate coupler 22, and tighten down the nut 20, on the bolt 19; of course, the holes for the bolts are first made through the rim and felly in any desirable mechanical way preferably drilling; and the bolts put up through their felly and run to their bolt heads 17 and 21. The other end of the resilient spoke at plate 22, between 23 and 24, it is apparent is put in place same as above described. There may be as many resilient spokes as rigid spokes 9, or there may be twice as many but preferably same number as the rigid spokes. As many bolts 5, and 6, may be placed through the tread bands 2, 2, as deemed necessary to hold the tread bands from moving longitudinally or receiving too much strain on the rubber bands at 5, and 6, alone.

The strength and size of the parts will affect the efficiency of this novel constructed spoke and the plate clamp 22, renders the making of both 10, and 11, springs without bolt holes in their ends, cheap to manufacture and more reliable for service.

The corrugated spring is more effective against lateral movement of the resilient spoke than the coil spring alone.

What I claim is:

1. In a spring wheel comprising a hub, a series of radially disposed spokes carried thereby, a felly carried by said spokes, and a metallic tire fastened to said felly, the combination therewith of two metal springs, one a corrugated spring having a buffer between its corrugations, inclosed in the convolutions of a coil wire spring, two duplicate clamping plates, each having a clutching groove and two clutching lugs and two bolt holes, two ends of said springs fastened to the clamping plate and said inner "metallic tire," and the other two ends of said springs fastened to a duplicate clamping plate and to a peripheral tire, and said clamping plates fastened to said tires by bolts and nuts, the springs arranged in pairs, serially and radially between the tires, to correspond with the spokes of the wheel hub, there being as many pairs of springs as hub spokes.

2. In a spring wheel comprising a hub, and radially disposed spokes carried thereby, a felly carried by said spokes, a metallic tire fastened to said felly, to said metallic tire being fastened clamping plates, each having a clutching groove and clutching lugs, which connects the metal springs together and to the metallic tire; one in each pair of springs being a corrugated spring, the other spring in each pair of springs being a coil wire spring having inclosed within its convolutions said corrugated spring, the other ends of said springs being attached in same way to duplicate clamping plates and to a peripheral tire and all fastened in same manner, by nuts and bolts.

3. In a spring wheel, comprising a hub, spokes carried by said hub, a felly fastened to said spokes and a metal tire fastened to said felly:—the combination of a series of metal springs arranged in pairs around said wheel circumferentially, one spring of each pair of springs being a corrugated spring, the other a coil wire spring which incloses by its convolutions the corrugated spring, to each of the ends of the springs of each pair being connected a clamping plate, the clamping plates each have a clutching groove and clutching lugs and bolt holes, and being attached one at each end of the pairs of springs, and to the inner tire and to the peripheral tire, by bolts and nuts.

4. In a vehicle wheel such as specified and shown; a coil wire spring, a corrugated spring placed in the convolutions of said coil wire spring, one end of each pair of said springs fastened to the inner tire, and the other end of the pairs of said springs fastened to the outer or peripheral tire, and means to fasten said springs together and to each of said tires substantially as and for the purposes specified and shown.

WALLACE CHILDS.

Witnesses:
GEO. N. ROBERTS,
JOSEPHUS S. CARR.